Patented June 3, 1924.

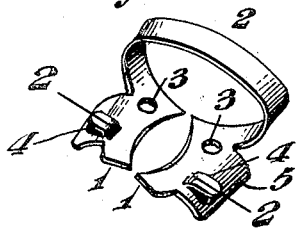
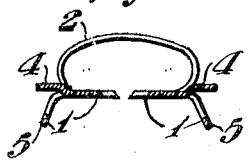
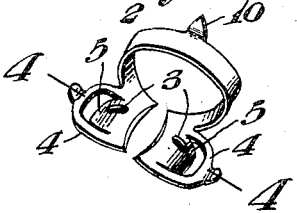
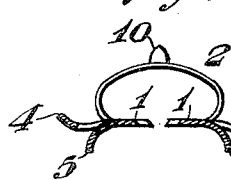
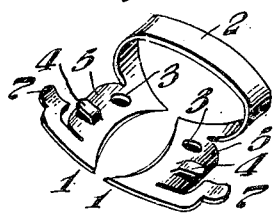
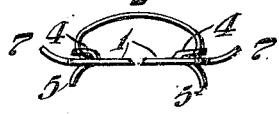
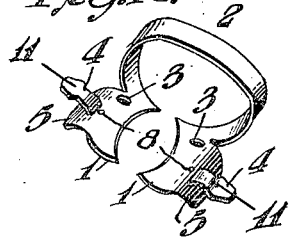
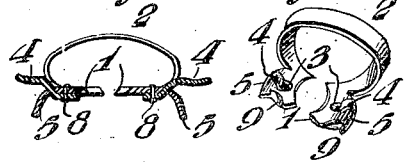

1,496,541

UNITED STATES PATENT OFFICE.

JAMES W. IVORY, OF PHILADELPHIA, PENNSYLVANIA.

RUBBER-DAM CLAMP.

Application filed July 1, 1922. Serial No. 572,158.

*To all whom it may concern:*

Be it known that I, JAMES W. IVORY, a citizen of the United States, residing in the city and county of Philadelphia, State of Pennsylvania, have invented a new and useful Rubber-Dam Clamp, of which the following is a specification.

My invention consists of a rubber dam clamp which is provided with lips which prevent shifting of the dam on the clamp effectively retaining the dam in position thereon.

It consists also in providing the bow of the clamp with a spur or pointed projection for the engagement of the relative portion of the dam therewith, and so retaining the same thereat.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a rubber dam clamp embodying my invention.

Figure 2 represents a transverse section thereof on line 2—2 Figure 1.

Figure 3 represents a perspective view of another embodiment of the invention.

Figure 4 represents a transverse section on line 4—4 Figure 3.

Figures 5, 6, 7, 8, 10 and 12 represent perspective views respectively of the embodiments of the invention.

Figure 9 represents an end elevation of Figure 8.

Figure 11 represents a transverse section on line 11—11 Figure 10.

Figure 13 represents an end elevation of Figure 12.

Similar numerals of reference indicate corresponding parts in the figures. Referring to the drawings, 1 designates the jaws of a rubber dam clamp, and 2 designates the bow which connects the same, said jaws having therein the openings 3 for the insertion of the bills of forceps, all as well known in the art.

On the side portions of the bodies of the jaws are the integral lips 4 and 5 both projecting laterally outwardly from said bodies, the lower lips 5 extending downwardly from said bodies, and the upper lips 4 overhanging said lips 5, so that spaces exist between the respective lips 4 and 5, to receive the adjacent portions of the rubber dam by which provision the rubber dam is controlled from rising and lowering on said bodies and so it is more effectively held in place when located on the device and in operation on a tooth.

In Figures 1 and 2 the upper lips 4 are punched out of the material of the lower lips. In Figures 3 and 4 the upper lips are of the form of loops turned up from the bodies of the jaws. In Figure 5 the bodies have thereon adjacent to the bases of the bow 2 the auxiliary lips 6 which extend laterally outwardly beyond the lower lips 5, while in Figures 6, 8 and 9 said bodies have on their forward ends the auxiliary lips 7 which extend laterally outward beyond the lower lips 5, the several auxiliary lips being respectively of somewhat different contours, but serving in each case in assisting to retain the relative portions of the rubber dam more effectively in position on the clamp.

In Figures 10 and 11 the inner ends of the upper lips pass through openings on the lower lips and are connected with the latter by the rivets 8.

In Figures 12 and 13 the bodies of the jaws have on their front ends the upturned lips 9 which are adapted to engage the adjacent portions of the rubber dam and thus further retaining the same in position.

In Figures 3 and 4 the bow has projecting from the top thereof the spur 10 which is adapted to penetrate the adjacent portion of the rubber dam and thus sustain said portion in position on said bow.

In Figure 1 the lips 4 prevent the rubber from slipping around the jaws 1—1 anteriorly. The operation is as follows:—

The operator punches a hole in the rubber, of suitable size and stretches the latter over the wings 5, then with the rubber dam clamp forceps engaging in the apertures 3 of the clamp, the jaws are spread and the flanges of the rubber are carried with the clamp to the tooth to be clamped.

In other forms of clamps of this kind there have been projections anterior to the length of the jaws that in a measure obscure the operation of finishing a filling with sand paper strips or discs and prevent the utilization of another clamp on a contiguous tooth that for convenience requires clamping.

The lips 4 and projections 7 in the various figures none of which are anterior to the jaws serve the same purpose as in old style clamps that have arms anterior to the forward free end of the jaws and laterally therewith, i. e., in the manipulation of the rubber dam by clamps of this design which I style rubber dam carrying clamps. The arm and lip 10 on the bow of the clamp is utilized, also for assisting the operator to control the rubber by the clamp in placing the dam to a tooth.

When the clamp with the various wings and lips have assisted the operator to carry the rubber to a tooth, the rubber is stripped from the wings 5 when the elasticity of the rubber allows the rubber to engage the neck of the tooth to prevent moisture from the cavity to fill the same.

In Figure 12, the lip 4 is thrown outwards and serves to hold the rubber from passing over the anterior and free end of the jaws, while the rubber dam clamp is carrying the rubber to the tooth, the same as the lips are in the other figures, but by this method of throwing out the lip in small narrow jaw clamps where there would not be room for apertures for spreading the clamp as in the wider jaw clamps the beak of the forcep may be used in the aperture made by the stamping of the lip out of the metal in the body of the jaw.

In Figure 7 the inner sides of the jaws 1 are formed with upturned lips 11 which rise therefrom and thereby provide additional surfaces for the clamp to take hold of a tooth and increase the tension on different lingual and buccal outlines on the borders of teeth between the necks and biting surfaces thereof. In said figure also the terminals of the jaws opposite to the laterally extending lips 7 have thereon the lips 12 which are bent forwardly so as to overhang the jaws and impart a pressing action on the distal and anterior teeth between the necks and biting surfaces on the teeth thus giving additional security to the clamp while also controlling the rubber dam in applying the latter to a tooth and preventing the dam from slipping up after the rubber has been stripped off the flanges 5.

Having thus described my invention what I claim as new and desire to secure by Letters Patent, is:—

1. A rubber dam clamp having on a jaw thereof adjacent to the bow of the clamp a lip forwardly projecting from the jaw and overhanging the latter.

2. A rubber dam clamp having jaws, a bow connecting the same, and a pointed prong on said body, said prong being adapted to penetrate the relative portion of the dam.

JAMES W. IVORY.

Witnesses:
 JOHN A. WIEDERSHEIM,
 N. BUSSINGER.